United States Patent
Takahashi

(10) Patent No.: US 9,509,446 B2
(45) Date of Patent: Nov. 29, 2016

(54) SIGNAL TRANSMISSION SYSTEM, SIGNAL RECEIVING DEVICE, SIGNAL SENDING DEVICE, SIGNAL RECEIVING DEVICE CONTROL PROGRAM, AND SIGNAL TRANSMISSION METHOD

(71) Applicant: NEC Corporation, Minato-ku, Tokyo (JP)

(72) Inventor: Tomohiro Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/513,869

(22) Filed: Oct. 14, 2014

(65) Prior Publication Data

US 2015/0110217 A1 Apr. 23, 2015

(30) Foreign Application Priority Data

Oct. 17, 2013 (JP) .................................. 2013-216067

(51) Int. Cl.
 *H04B 15/00* (2006.01)
 *H04L 1/00* (2006.01)
 *H04L 1/20* (2006.01)

(52) U.S. Cl.
 CPC ........... *H04L 1/0075* (2013.01); *H04L 1/0001* (2013.01); *H04L 1/20* (2013.01)

(58) Field of Classification Search
 CPC ..... H04L 1/0026; H04L 1/20; H04L 5/0091; H04L 25/0272; H04L 1/00; H04L 5/00; H04L 12/26; H04L 1/0001; H04W 52/241; H04W 24/08; H04W 52/24; H04B 7/0413; H04B 7/0632; H04B 1/0483; H04B 17/0085; H04B 17/26; H04B 10/0775; H04B 10/0779
 USPC ........ 375/260, 346, 285, 220, 257; 455/103; 702/69
 See application file for complete search history.

(56) References Cited

U.S. PATENT DOCUMENTS

| | | | | |
|---|---|---|---|---|
| 2008/0175341 A1* | 7/2008 | Sato | ........................ | H04L 25/08 375/371 |
| 2011/0019762 A1* | 1/2011 | Tsubota | ................ | H04L 1/0002 375/295 |
| 2012/0324134 A1* | 12/2012 | Tsuji | ....................... | H04L 25/02 710/301 |

FOREIGN PATENT DOCUMENTS

| JP | H08167868 A | 6/1995 |
|---|---|---|
| JP | 2004235703 A | 8/2004 |

(Continued)

OTHER PUBLICATIONS

Japanese Office Action for JP Application No. 2013-216067 mailed on Sep. 1, 2015 with English Translation.

(Continued)

*Primary Examiner* — Rahel Guarino

(57) ABSTRACT

A signal transmission system includes: a signal sending device including a signal sender converting a sending signal to a transmission signal using a signal sending parameter and sends the transmission signal to a signal path, and a sending controller receiving a sending control signal and changes the signal sending parameter according to the sending control signal; and a signal receiving device including a signal receiver converting the transmission signal received via the signal path, to a reception signal using a signal reception parameter, a signal reception monitor monitoring a signal reception status of the transmission signal and outputs monitor information acquired by the monitoring, and a reception controller checking transmission quality of the signal path using the monitor information, creates the sending control signal for changing the signal sending parameter according to a checking result to send, and changes the signal reception parameter.

11 Claims, 7 Drawing Sheets

(56) References Cited

FOREIGN PATENT DOCUMENTS

| | | | | |
|---|---|---|---|---|
| JP | 2007053648 A | 3/2007 | | |
| JP | 2008288671 | * 11/2008 | ............ | H04B 17/00 |
| JP | 2008288671 A | 11/2008 | | |
| JP | 2011-41109 A | 2/2011 | | |
| JP | 2011029729 A | 2/2011 | | |
| JP | 2013021681 A | 1/2013 | | |
| JP | 2013-168784 A | 8/2013 | | |

OTHER PUBLICATIONS

Japanese Office Action for JP Application No. 2013-216067 mailed on Nov. 24, 2015 with English Translation.

* cited by examiner

SIGNAL TRANSMISSION SYSTEM, SIGNAL RECEIVING DEVICE, SIGNAL SENDING DEVICE, SIGNAL RECEIVING DEVICE CONTROL PROGRAM, AND SIGNAL TRANSMISSION METHOD

This application is based upon and claims the benefit of priority from Japanese Patent Application No. 2013-216067, filed on Oct. 17, 2013, the disclosure of which is incorporated herein in its entirety by reference.

TECHNICAL FIELD

The present invention relates to a signal transmission system, a signal receiving device, a signal sending device, a signal receiving device control program, and a signal transmission method which make it possible to ensure transmission quality in signal transmission.

BACKGROUND ART

Recent years have shown a significant increase of the speed of interfaces for an interconnection between information devices. With the increase of the speed of the connection provided by interfaces, "transmission parameters" for transmission signals are often adjusted between devices. An example of the "transmission parameters" is an emphasis value which indicates the degree of emphasis on the amplitude of a transmission signal or a transmission waveform in a high-frequency band. Adjustment of the transmission parameters is important especially for ensuring transmission quality in the case of using a high-speed interface. However, it is often the case that adjustment of transmission parameters is performed only at the time of establishing a link between information devices without performing adjustment thereafter until the link is disconnected, instead of performing the adjustment constantly.

Japanese Patent Application Laid-open Publication No. 2011-41109 (referred to as "Patent Literature 1" below) discloses that multiple values are prepared for each transmission parameter in advance. For example, in the technique of Patent Literature 1, multiple values are prepared for each transmission parameter so as to correspond to the respective operation frequencies to be used by an interface. In the technique of Patent Literature 1, when the interface operates in a power-saving mode, a value of each transmission parameter corresponding to the operation frequency of the power-saving mode is selected. By contrast, when the interface operates in a high-speed mode, a value of each transmission parameter corresponding to an operation frequency of the high-speed mode is selected. In the technique of Patent Literature 1, the value of transmission parameter selected for each operation frequency is used by the interface.

As described above, in the technique of Patent Literature 1, values are prepared in advance for each transmission parameter so as to correspond to the respective operation modes of the interface. This allows the technique of Patent Literature 1 to eliminate the need for time to adjust transmission parameters at the time of changing between the operation modes, and to use of the optimal value of each transmission parameter.

SUMMARY

An object of the present invention is to provide a signal transmission system, a signal receiving device, a signal sending device, a signal receiving device control program, and a signal transmission method which make it possible to prevent deterioration in transmission quality in signal transmission due to a long-duration use or environmental deterioration of the devices.

A signal transmission system comprising:
a signal sending device including
a first signal sender which converts a sending signal to a first transmission signal by using a first signal sending parameter and sends the first transmission signal to a first signal path, and
a sending controller which receives a first sending control signal and changes the first signal sending parameter according to the first sending control signal; and
a signal receiving device including
a first signal receiver which converts the first transmission signal received via the first signal path, to a first reception signal by using a first signal reception parameter,
a first signal reception monitor which monitors a signal reception status of the first transmission signal and outputs first monitor information acquired by the monitoring, and
a reception controller which checks transmission quality of the first signal path by using the first monitor information, creates and sends the first sending control signal for changing the first signal sending parameter according to a result of the check, and changes the first signal reception parameter.

A signal receiving device comprising:
a signal receiver which receives a transmission signal obtained by converting a sending signal by using a predetermined signal sending parameter and sent to a signal path, and converts the transmission signal to a reception signal by using a predetermined signal reception parameter;
a signal reception monitor which monitors a signal reception status of the transmission signal and outputs monitor information acquired by the monitoring; and
a reception controller which checks transmission quality of the signal path by using the monitor information, creates and sends a sending control signal for changing the signal sending parameter according to a result of the check, and changes the signal reception parameter.

A signal sending device comprising:
a signal sender which converts a sending signal to a transmission signal by using a signal sending parameter and sends the transmission signal to a signal path; and
a sending controller which monitors a signal reception status of the transmission signal, checks transmission quality of the signal path according to monitor information acquired by the monitoring, receives a sending control signal for changing the signal sending parameter, the sending control signal being created according to a result of the check, and changes the signal sending parameter according to the sending control signal.

A signal receiving device control program for causing a computer included in a signal receiving device, the signal receiving device including a signal receiver which receives a transmission signal and converts the transmission signal to a reception signal by using a predetermined signal reception parameter, and a signal reception monitor which monitors a signal reception status of the transmission signal and outputs monitor information acquired by the monitoring,
to operate as a reception controller which checks transmission quality according to the monitor information, and creates and sends a sending control signal for changing a predetermined signal sending parameter to be used for converting the transmission signal, according to a result of the check.

A signal transmission method comprising:

converting a sending signal to a transmission signal by using a predetermined signal sending parameter, and sending the transmission signal to a signal path;

receiving the transmission signal via the signal path, converting the transmission signal to a reception signal by using a predetermined signal reception parameter, and outputting the reception signal;

monitoring a signal reception status of the transmission signal, and outputting monitor information acquired by the monitoring;

checking transmission quality of the signal path according to the monitor information, creating and sending a sending control signal for changing the signal sending parameter, according to a result of the check; and receiving the sending control signal, and changing the signal sending parameter according to the sending control signal.

BRIEF DESCRIPTION OF THE DRAWINGS

Exemplary features and advantages of the present invention will become apparent from the following detailed description when taken with the accompanying drawings in which.

EXEMPLARY EMBODIMENT

In the following, detailed description will be given of exemplary embodiments of the present invention with reference to the drawings.

First Exemplary Embodiment

Figure 1:
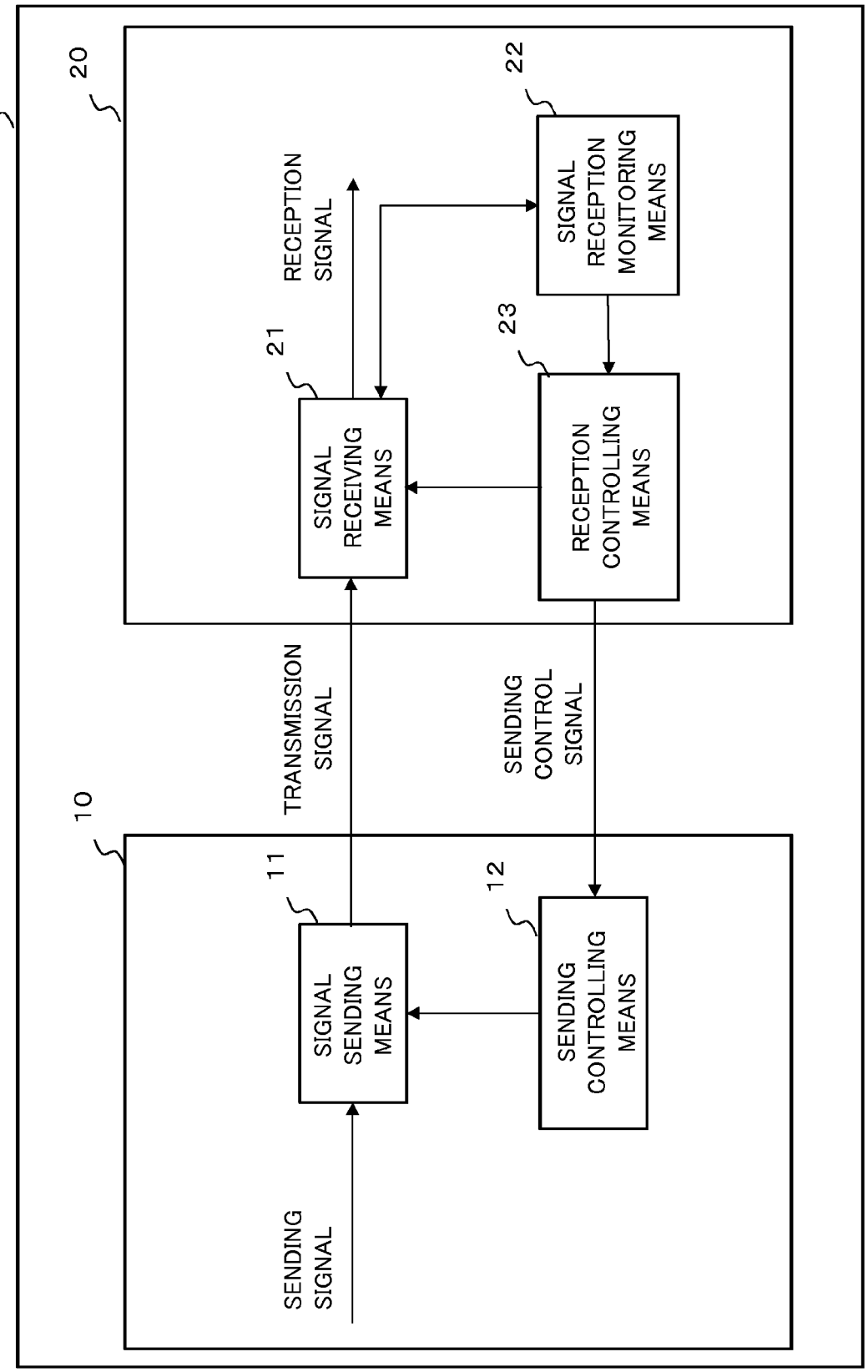
FIG. 1 is a block diagram illustrating an example of the configuration of a signal transmission system according to a first exemplary embodiment of the present invention.
Figure 2:
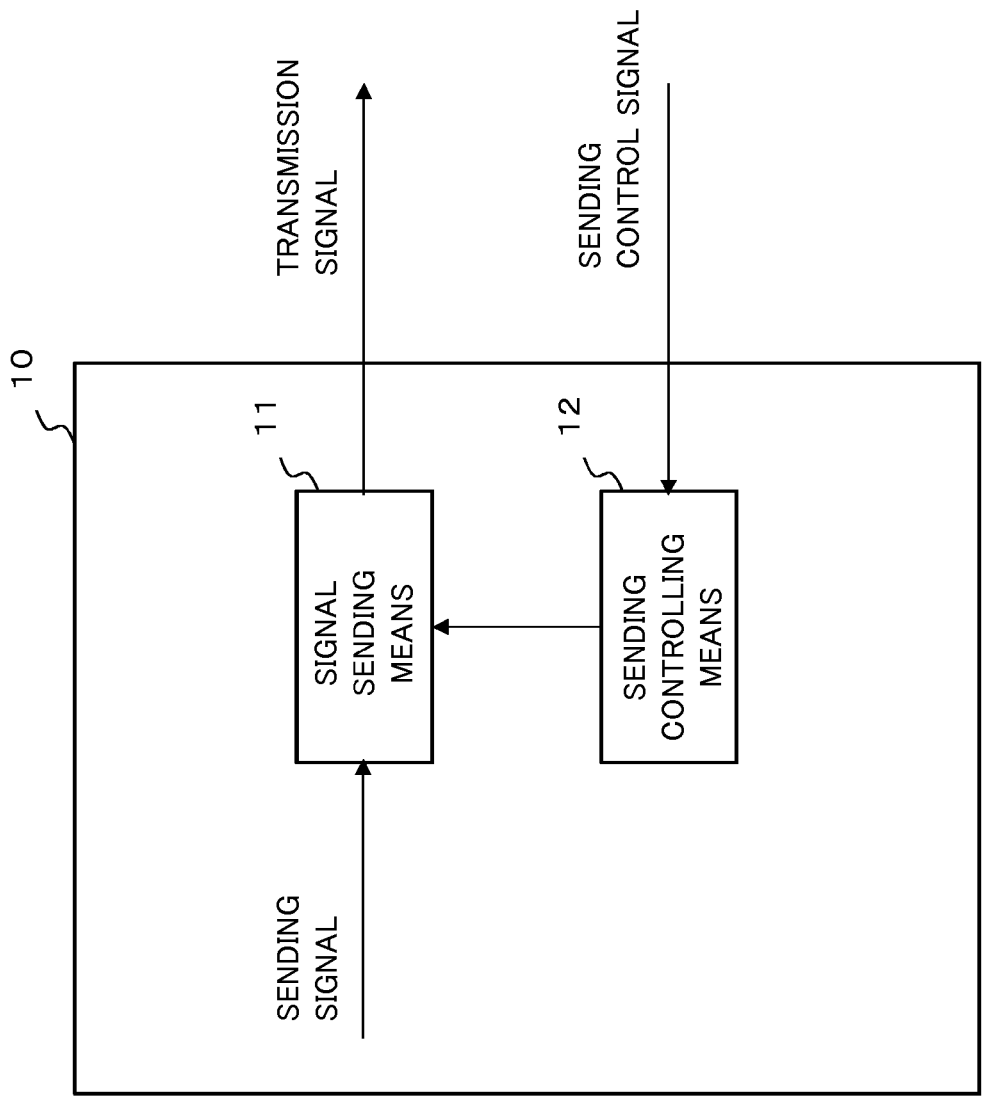
FIG. 2 is a block diagram illustrating an example of the configuration of a signal sending device according to the first exemplary embodiment of the present invention.
Figure 3:
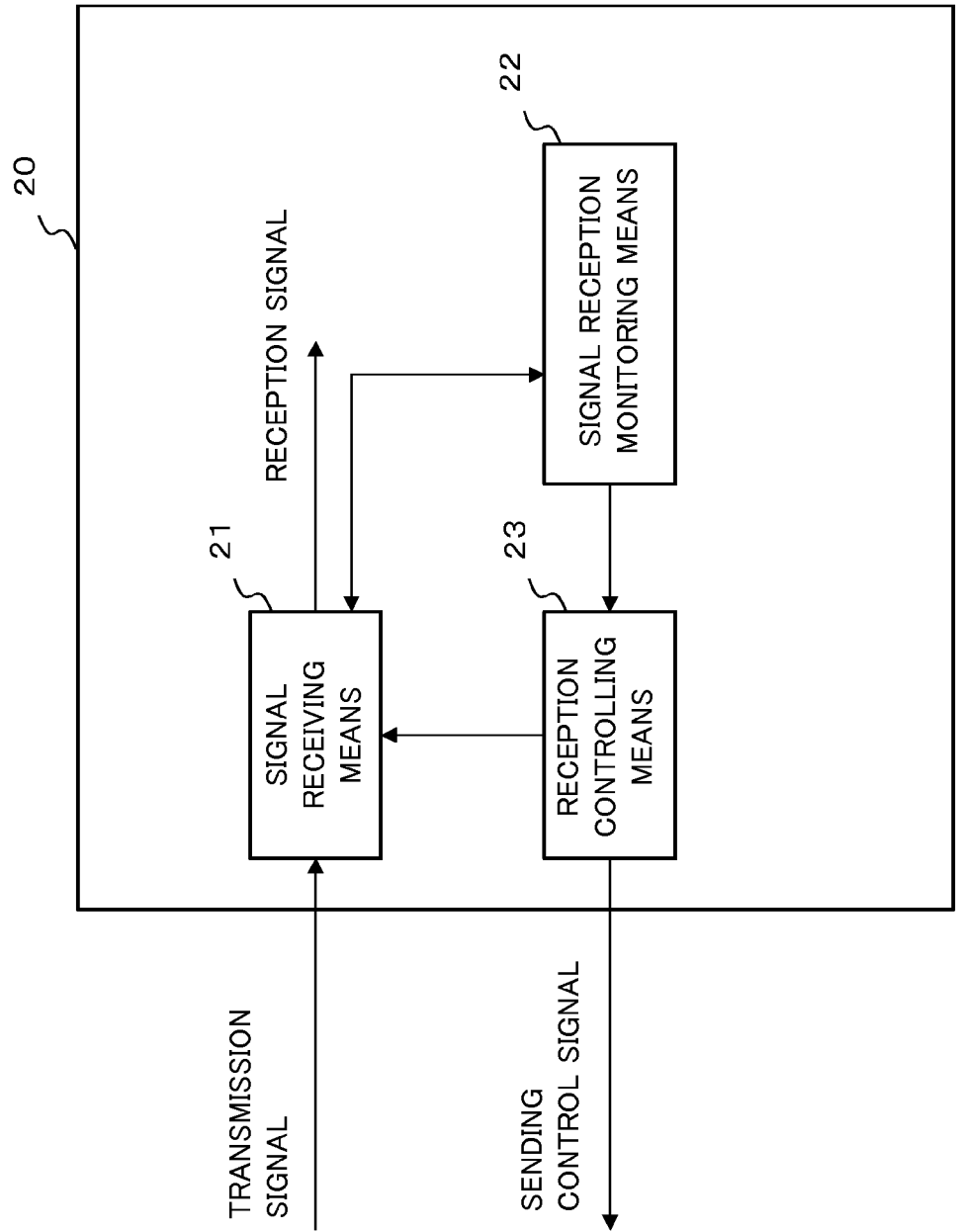
FIG. 3 is a block diagram illustrating an example of the configuration of a signal receiving device according to the first exemplary embodiment of the present invention.

A first exemplary embodiment of the present invention will be described. FIG. 1 is a block diagram illustrating an example of the configuration of a signal transmission system 1 according to this exemplary embodiment. FIG. 2 is a block diagram illustrating an example of the configuration of a signal sending device 10 according to this exemplary embodiment. FIG. 3 is a block diagram illustrating an example of the configuration of a signal receiving device 20 according to this exemplary embodiment.

With reference to FIGS. 1 to 3, the configuration of the signal transmission system 1 of this exemplary embodiment will be described.

The signal transmission system 1 includes the signal sending device 10 and the signal receiving device 20. The signal sending device 10 includes a signal sending means 11 and a sending controlling means 12. The signal receiving device 20 includes a signal receiving means 21, a signal reception monitoring means 22, and a reception controlling means 23.

The signal sending means 11 of the signal sending device 10 converts a sending signal according to a predetermined conversion manner, and then sends the obtained signal as a transmission signal. The sending controlling means 12 receives a sending control signal from an external device, and controls the signal sending means 11 on the basis of the sending control signal. The operations for the control performed by the sending controlling means 12 will be described later.

The signal receiving device 20 receives the transmission signal from the signal sending device 10 via a signal path. The signal receiving means 21 receives the transmission signal, performs predetermined conversion on the transmission signal, and then outputs the obtained signal as a reception signal. The signal reception monitoring means 22 monitors the received waveform of the transmission signal received by the signal receiving means 21, and the reception signal obtained by converting the transmission signal. The reception controlling means 23 controls the signal receiving means 21 on the basis of monitor information from the signal reception monitoring means 22, and sends a sending control signal to the signal sending device 10. The operations for the monitoring and the contents of the monitor information will be described later.

With reference to FIGS. 1 to 3, the operation of the signal transmission system 1 of this exemplary embodiment will be described.

A predetermined signal reception parameter is set in the signal receiving means 21, for receiving the transmission signal. Concrete examples of the "signal reception parameter" are input impedance of the signal receiving means 21 seen from the signal path, and "conversion threshold values" for converting a transmission signal to a reception signal. For example, in the case of conversion of a binary digital signal to a reception signal, the "conversion threshold values" are a threshold value for converting 0 to 1 and a threshold value for converting 1 to 0. The signal reception parameter set in the signal receiving means 21 is one appropriate for receiving a transmission signal. For example, the signal reception parameter is set in the signal receiving means 21 so as to correspond to the carrier frequency and the modulation method of the transmission signal. The signal receiving means 21 converts the transmission signal on the basis of the currently-set signal reception parameter, and then outputs the obtained signal as a reception signal.

The signal reception monitoring means 22 monitors the transmission signal received by the signal receiving means 21. Specifically, the signal reception monitoring means 22 monitors the received waveform of the transmission signal, and the reception signal obtained by converting the transmission signal, to detect "distortion of the received waveform" and "receiver errors."

The received waveform of the transmission signal is different from the original received waveform due to environmental changes in the signal path for the transmission signal, long-duration use of the devices, and the like. The "distortion of the received waveform" corresponds to the difference between the original received waveform and the received waveform of the transmission signal. The distortion of the received waveform occurs due to temperature drift, voltage drift, and deterioration in the signal path from the signal sending device 10 to the signal receiving device 20 (e.g., a bent portion, a contact portion of a signal cable and the like, and other components), for example.

The signal reception parameter of the signal receiving means 21 is set in consideration of the received waveform of the transmission signal with predetermined allowable range. For example, the conversion threshold values are set at values with which presumable effects of noise can be eliminated. If distortion of the received waveform exceeds the set allowable range of the received waveform, a "receiver error" occurs at the time of converting the transmission signal to the reception signal.

A "receiver error" is a state in which sending signal data values transmitted by using a transmission signal from the signal sending side are different from reception signal data values obtained by converting the transmission signal at the signal receiving side.

In general, a set of data values transmitted by using a transmission signal (referred to as "sending signal data" below) includes, for example, a header section indicating the beginning of a sending signal data main body, a pay load section corresponding to the sending signal data main body, and a check data section generated on the basis of the sending signal data main body. Accordingly, when reception signal data values are received normally, a sending signal check data section generated at the signal sending side and sent to the signal receiving side matches a regenerated check data section generated on the basis of the set of data values in the reception signal obtained as a result of conversion at the signal receiving side (referred to as "reception signal data" below). In this case, the signal reception monitoring means 22 does not detect any receiver error.

However, when distortion of the received waveform occurs and is outside the predetermined allowable range as in the case described above, part of the reception signal data may contain a signal reception error. If a signal reception error occurs, the sending signal check data section and the regenerated check data section do not match. In this case, the signal reception monitoring means 22 detects the above mismatch, i.e., a receiver error.

For monitoring the received waveform of the transmission signal, the signal reception monitoring means 22 observes, for example, whether any overshoot or undershoot exists in the received waveform. For example, a signal level for determining that overshoot has occurred in the received waveform is set in the signal reception monitoring means 22 as an overshoot threshold value. Then, the signal reception monitoring means 22 measures overshoot time in which the signal level of the received waveform is above the overshoot threshold value, and aggregates the measured overshoot time in a predetermined time period.

Meanwhile, a signal level for determining that undershoot has occurred in the received waveform is set in the signal reception monitoring means 22 as an undershoot threshold value. Then, the signal reception monitoring means 22 measures undershoot time in which the signal level of the received waveform is under the undershoot threshold value, and aggregates the measured undershoot time in a predetermined time period.

The signal reception monitoring means 22 may set, for example, the ratio of the aggregated overshoot time or the ratio of the aggregated undershoot time to the predetermine time period, to be a measured overshoot value and a measured undershoot value, respectively. The signal reception monitoring means 22 determines the degree of distortion of the received waveform, based on detection of deviation of the measured overshoot value or the measured undershoot value from a predetermined waveform determination range.

In other words, when the overshoot value and the undershoot value obtained by observing the received waveform are both outside the waveform determination range, the signal reception monitoring means 22 determines that the amplitude of the signal level of the received waveform is larger than that of the signal level of the original received waveform. By contrast, when either the overshoot value or the undershoot value is outside the waveform determination range, the signal reception monitoring means 22 determines that the average value of the amplitude of the signal level of the received waveform has changed from that of the signal level of the original received waveform. Further, when neither of the overshoot value nor the undershoot value is observed, the signal reception monitoring means 22 determines that the amplitude of the signal level of the received waveform is smaller than that of the signal level of the original received waveform.

The signal reception monitoring means 22 determines measurement information obtained by observing the received waveform, e.g., the degree of deviation of each of the overshoot value and the undershoot value from the waveform determination range, to be the degree of distortion of the received waveform.

Note that, although description has been given above of determination on the degree of distortion of a received waveform based on observation of an overshoot value and an undershoot value, the determination on the degree of distortion of a received waveform in the present invention is not limited to that based on observation of an overshoot value and an undershoot value.

For example, the signal reception monitoring means 22 may determine the degree of distortion of a received waveform by observing the maximum value and the minimum value of the signal level of the received waveform for a predetermined time period. For example, the signal reception monitoring means 22 may determine the degree of distortion of the received waveform by detecting, for each of the maximum value and the minimum value of the signal level of the received waveform obtained by observing the received waveform, whether or not the value is deviating from a determination range of maximum-value and minimum-value determination ranges set on the basis of the maximum value and the minimum value of the original received waveform.

In other words, the determination on the degree of distortion of the received waveform by the signal reception monitoring means 22 may be based on any measures as long as the signal reception monitoring means 22 can determine whether or not the received waveform is deviating from a waveform determination range set by observing the original received waveform. Hence, the concrete contents of the measurement information obtained by observing the received waveform to be used for determination are not particularly specified.

In addition, the signal reception monitoring means 22 monitors occurrences of a receiver error and the frequency of occurrences of a receiver error. For example, the signal reception monitoring means 22 detects, as a receiver error, mismatch of the signal sending check data section in the sending signal data and the regenerated check data section in the reception signal data obtained by converting the transmission data. The signal reception monitoring means 22 sets the number of times a receiver error is detected in a predetermined time, to be the frequency of occurrences of a receiver error. Based on detection of the frequency of the occurrences of a receiver error exceeding a pre-set receiver error determination threshold value, the signal receiver monitoring means 22 determines whether or not an error has occurred in the reception signal data.

The signal reception monitoring means 22 outputs, to the reception controlling means 23, monitor information including the measurement information including the measured value obtained as a result of observing the received waveform and the result of determination on the obtained measured value, and detection information including the value detected from the reception signal data and the result of determination on the detected value. An example of the measured value obtained as a result of observing the received waveform is the above-described overshoot value (or undershot value). An example of the result of determination on the obtained measured value is the result of determination on whether or not the measured overshoot value (or undershoot value) falls within the predetermined overshoot determination range (or undershoot determination range), and the degree of deviation when the measured value is outside the determination range. Moreover, an example of the value detected from the reception signal data is the frequency of occurrences of a receiver error. An example of the result of determination on the detected value is the result of determination on whether or not the frequency of occurrences of a receiver error is above the receiver error determination threshold value.

The reception controlling means 23 determines whether or not to change the transmission parameters, on the basis of the monitor information. Specifically, when determining, on the basis of the monitor information, that the transmission quality of the transmission signal is degraded, the reception controlling means 23 changes the signal reception parameter set in the signal receiving means 21. Then, the reception controlling means 23 creates and sends a sending control signal for changing the predetermined "signal sending parameter" set in the signal sending means 11 of the signal sending device 10. An example of the "signal sending parameter" is a parameter to be used when the signal sending means 11 of the signal sending device 10 converts a sending signal to a transmission signal. Specifically, an example of a signal sending parameter is an emphasis value which indicates the degree of emphasis on the amplitude of a transmission signal or a transmission waveform in a high-frequency band.

The signal sending means 11 converts the sending signal to the transmission signal by using the preset signal sending parameter, and then sends the obtained transmission signal. The sending controlling means 12 receives the sending control signal from the signal receiving device 20, and thereby changes the signal sending parameter set in the signal sending means 11 accordingly.

Thus, the reception controlling means 23 attempts to ensure the transmission quality by changing the set values of the signal reception parameter and the signal sending parameter, which are provided as the transmission parameters. Moreover, the reception controlling means 23 does not change any transmission parameters when determining the transmission quality falls within an allowable range, on the basis of the monitor information.

Figure 4:
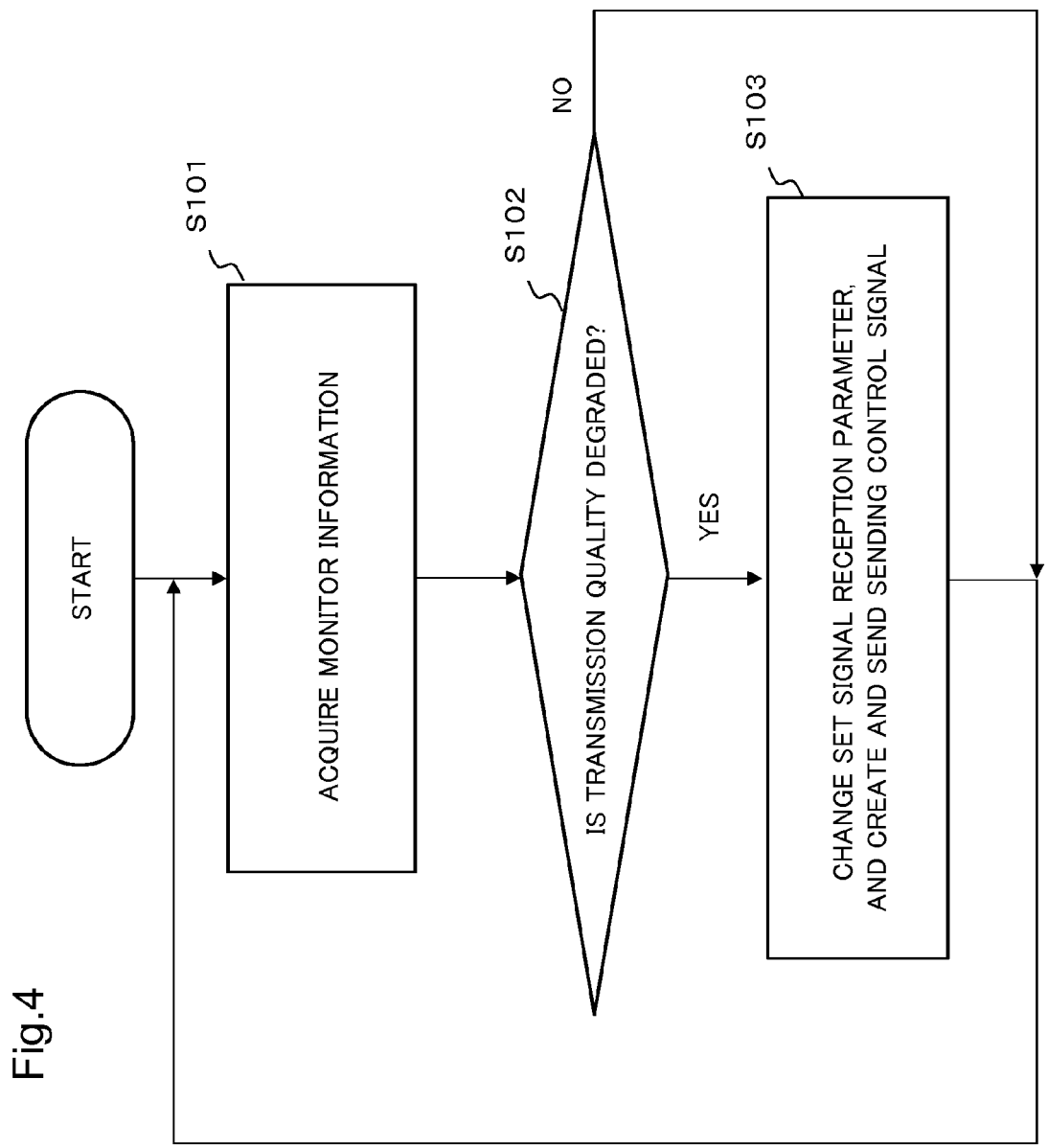
FIG. 4 is a flowchart illustrating an example of the operation of the signal receiving device according to the first exemplary embodiment of the present invention.

FIG. 4 is a flowchart illustrating an example of the operation of the signal receiving device 20 of the signal transmission system 1 of this exemplary embodiment. The operation of the signal receiving device 20 will be described with reference to FIG. 4.

The reception controlling means 23 of the signal receiving device 20 acquires, from the signal reception monitoring means 22, monitor information including measurement information obtained as a result of observing the received waveform of a transmission signal and detection information obtained by monitoring a reception signal obtained by converting the transmission signal (S101).

The reception controlling means 23 determines whether or not the transmission quality of the transmission signal is degraded, on the basis of the monitor information (S102).

When determining that the transmission quality is not degraded (No in S102), the reception controlling means 23 returns to the operation in Step S101.

When determining that the transmission quality is degraded (Yes in S102), the reception controlling means 23 changes the set transmission parameters (S103). Specifically, the reception controlling means 23 changes the signal reception parameter set in the signal receiving means 21. In addition, the reception controlling means 23 creates and sends a sending control signal for changing the signal sending parameter set in the signal sending device 10.

The reception controlling means 23 changes the transmission parameters by performing the above-described operations, and thereafter returns to the operation in Step S101.

As has been described, the signal transmission system 1 of this exemplary embodiment monitors the transmission quality in signal transmission, and determines whether or not the transmission quality is degraded, on the basis of monitor information acquired by the monitoring. In addition, in this exemplary embodiment, transmission parameters are adjusted on the basis of the result of determination on the transmission quality. In this way, it is possible to ensure transmission quality in signal transmission by detecting deterioration of the transmission quality in the signal transmission and thereby adjusting the transmission parameters, in this exemplary embodiment.

Note that the flowchart for the signal receiving device 20 of the signal transmission system 1 illustrated in FIG. 4 is provided as an example of an exemplary embodiment of the signal receiving device 20 related to the present invention, and the operation of the present invention is not limited only to that illustrated in the flowchart in FIG. 4.

Second Exemplary Embodiment

Figure 5:
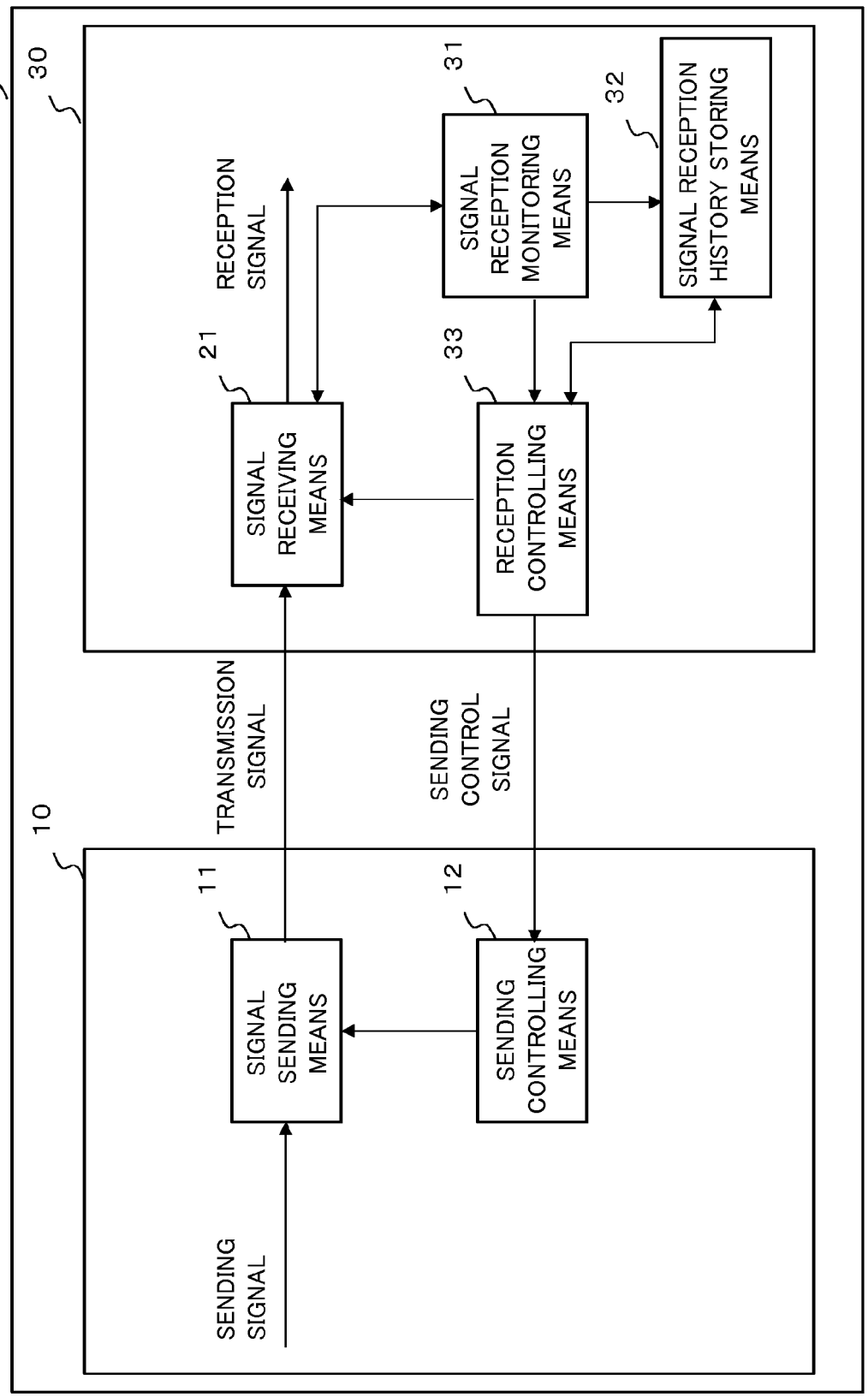
FIG. 5 is a block diagram illustrating an example of the configuration of a signal transmission system according to a second exemplary embodiment of the present invention.

A second exemplary embodiment of the present invention will be described. FIG. 5 is a block diagram of a signal transmission system 2 of this exemplary embodiment.

With reference to FIG. 5, the configuration and the operation of the signal transmission system 2 of this exemplary embodiment will be described.

The signal transmission system 2 includes the signal sending device 10 and a signal receiving device 30. The signal sending device 10 is the same as that described using FIG. 2. The signal receiving device 30 has the same configuration as that of the signal receiving device 20 described using FIG. 3, except that the signal reception monitoring means 22 and the reception controlling means 23 of the signal receiving device 20 are changed to a signal reception monitoring means 31 and a reception controlling means 33, and a signal reception history storing means 32 is additionally included. Accordingly, the same components are named the same and denoted by the same numerals. In addition, description is given only of the differences and is omitted for the same components.

The signal receiving device 30 receives a transmission signal from the signal sending device 10. The signal reception monitoring means 31 monitors the transmission signal received by the signal receiving means 21. Specifically, the signal reception monitoring means 31 observes the received waveform of the transmission signal, and monitors a reception signal obtained by converting the transmission signal. The signal reception monitoring means 31 stores, in the signal reception history storing means 32, measurement information obtained by observing the received waveform, e.g., an overshoot value, and time information indicating the time point at which the overshoot value was observed. Moreover, the signal reception monitoring means 31 stores, in the signal reception history storing means 32, detection information obtained by monitoring the reception signal obtained by converting the transmission signal, e.g., the frequency of occurrences of a receiver error, and time information indicating the time point at which the frequency of occurrences of a receiver error was monitored. The signal reception monitoring means 31 stores, in the signal reception history storing means 32, the measurement information and the detection information, which are monitor information obtained by monitoring the transmission signal, as signal reception history information.

The reception controlling means 33 determines whether or not to change the transmission parameters, on the basis of the monitor information from the signal reception monitoring means 31 and the signal reception history information from the signal reception history storing means 32. The reception controlling means 33 checks change related to reception of transmission signal with time, on the basis of the current monitor information of the transmission signal and the stored signal reception history information. On the basis of the current monitor information of the transmission signal and the result obtained by the check of change with time, the reception controlling means 33 determines whether or not to change the transmission parameters by making determination on deterioration of transmission quality in signal transmission.

In other words, the reception controlling means 33 determines a sign of deterioration of signal transmission quality, on the basis of the distortion of the received waveform of the transmission signal and the trend of the change of the frequency of occurrences of a receiver error with time. For example, in the case where the rate of change of the overshoot values with time is higher than or equal to a certain value according to the stored signal reception history information, the reception controlling means 33 determines that deterioration of the transmission quality is accelerating, even when the current monitor information, e.g., the overshoot value, of the transmission signal is within a preset allowable range. Then, on the basis of the determination result, the reception controlling means 33 changes the transmission parameters. In other words, the reception controlling means 33 changes the signal reception parameter set in the signal receiving means 21, creates a sending control signal for changing signal sending parameter set in the signal sending device 10, and then outputs the sending control signal to the signal sending device 10.

Thus, in the case of determining that the transmission quality is degraded, or that the transmission quality has been rapidly declining even when the degree of the deterioration of the transmission quality is within the allowable range, the reception controlling means 33 can ensure transmission quality by changing set transmission parameters.

As described above, the signal transmission system 2 of this exemplary embodiment monitors transmission quality in signal transmission, and stores monitor information acquired by monitoring, as signal reception history information. Accordingly, in this exemplary embodiment, it is possible to determine whether transmission quality is degraded, in consideration of change with time as well as the stored signal reception history information in addition to the current monitor information of the transmission signal.

Moreover, in this exemplary embodiment, the transmission parameters are adjusted on the basis of the above-described determination result. Hence, according to this exemplary embodiment, it is possible to ensure transmission quality in signal transmission by detecting deterioration of the transmission quality in the signal transmission and adjusting the transmission parameters.

Note that description has been given in this exemplary embodiment that the monitor information from the signal reception monitoring means is stored as signal reception history information. However, the signal reception history information stored in the present invention is not limited to monitor information.

For example, change information including the contents of change of the transmission parameters by the reception controlling means and time information indicating the time point of the change may be stored in the signal reception history storing means. In this case, the signal reception control means may adjust the transmission parameters on the basis of the correlation between the transmission parameter change information and the monitor information stored in the signal reception history storage means. Specifically, if an increase of the signal level set as a conversion threshold value is related to a decrease of the frequency of occurrences of a receiver error, the signal reception control means may adjust the conversion threshold value, which is a signal reception parameter, on the basis of the above relationship.

Third Exemplary Embodiment

Figure 6:
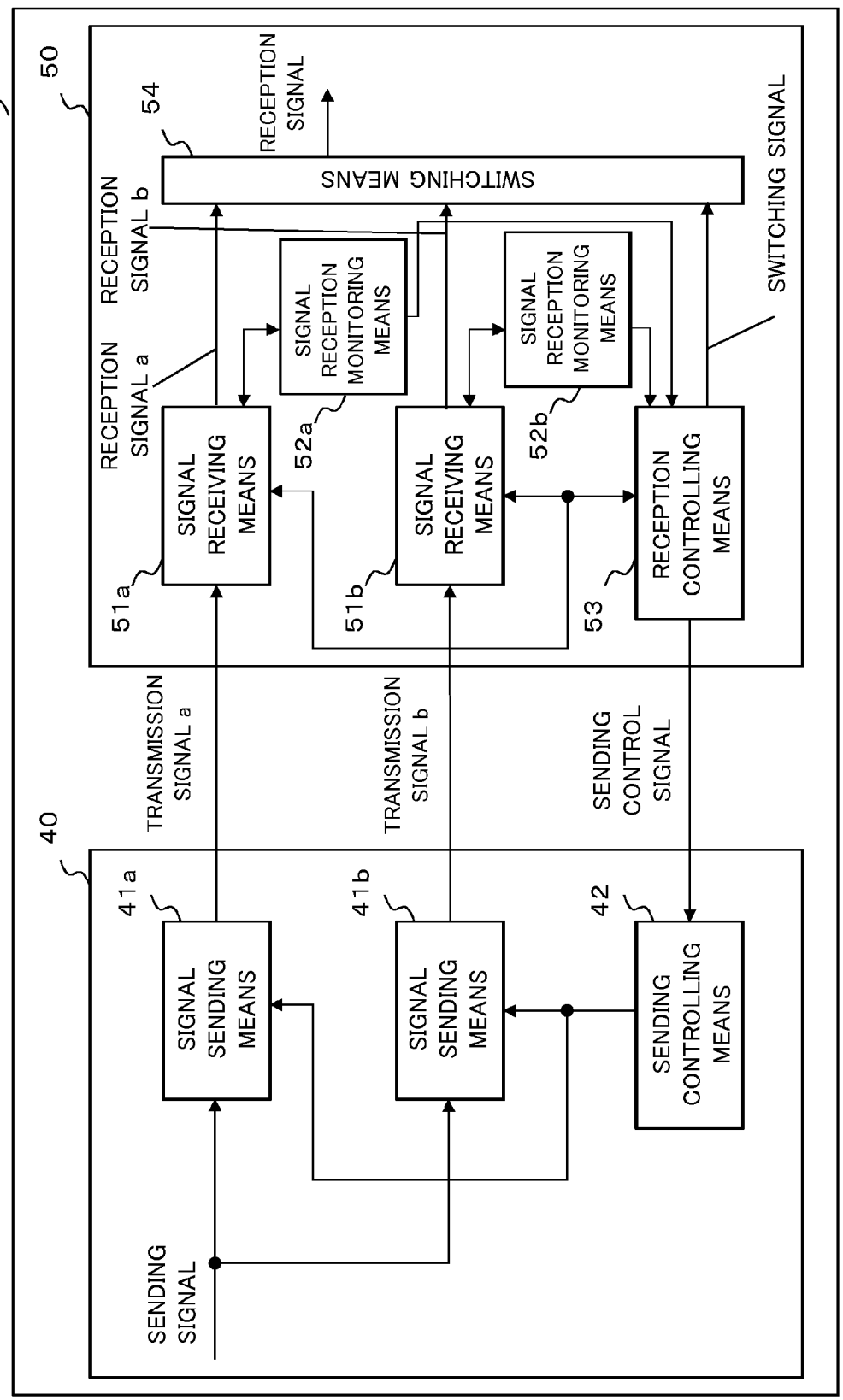
FIG. 6 is a block diagram illustrating an example of the configuration of a signal transmission system according to a third exemplary embodiment of the present invention.

A third exemplary embodiment of the present invention will be described. FIG. 6 is a block diagram of a signal transmission system 3 of this exemplary embodiment.

The configuration of the signal transmission system 3 of this exemplary embodiment will be described with reference to FIG. 6. The signal transmission system 3 includes a signal sending device 40 and a signal receiving device 50.

The signal sending device 40 includes a signal sending means 41a, a signal sending means 41b, and a sending controlling means 42. The signal receiving device 50 includes a signal receiving means 51a, a signal receiving means 51b, a signal reception monitoring means 52a, a signal reception monitoring means 52b, a reception controlling means 53, and a switching means 54.

The signal sending device 40 sends transmission signals a and b to the signal receiving device 50. The signal sending means 41a converts a sending signal to the transmission signal a by using a signal sending parameter a, and then sends the obtained transmission signal a to the signal receiving device 50. The signal sending means 41b converts the sending signal to the transmission signal b by using a signal sending parameter b, and then sends the obtained transmission signal b to the signal receiving device 50. The sending controlling means 42 controls the signal sending means 41a and 41b on the basis of a sending control signal from the signal receiving device 50.

The signal receiving device 50 receives the transmission signals a and b from the signal sending device 40. The signal receiving means 51a converts the transmission signal a to a reception signal a by using a signal reception parameter a, and then outputs the obtained reception signal a. The signal receiving means 51b converts the transmission signal b to a reception signal b by using a signal reception parameter b, and then outputs the obtained reception signal b. The signal reception monitoring means 52a monitors received waveform a of the received transmission signal a, and the reception signal a obtained by converting the transmission signal a. The signal reception monitoring means 52b monitors received waveform b of the received transmission signal b, and the reception signal b obtained by converting the transmission signal b. The reception controlling means 53 controls the signal receiving means 51a and 51b and the switching means 54 on the basis of monitor information a and monitor information b respectively from the signal reception monitoring means 52a and 52b. In addition, the reception controlling means 53 creates a sending control signal on the basis of the monitor information a and monitor information b respectively from the signal reception monitoring means 52a and 52b, and then sends the created sending control signal to the signal sending device 40. The switching means 54 selects either the reception signal a or b according to a switching signal input from the reception controlling means 53, and then outputs the selected reception signal as a reception signal.

With reference to FIG. 6, the operation of the signal transmission system 3 of this exemplary embodiment will be described.

In this exemplary embodiment, the signal sending device 40 converts the sending signal to the transmission signals a and b, and thereby sends the transmission signals a and b in two lines, i.e., line a and line b, respectively. Then, the signal receiving device 50 receives the transmission signals a and b in the two lines via signal paths a and b, respectively, and selects, as a reception signal, an appropriate one of the reception signals a and b output as a result of predetermined conversion.

In the following, description will be given of respects which are made different by using transmission signals in two lines, and the operation related to the switching means 54 added in this exemplary embodiment.

The signal sending means 41a and the signal sending means 41b individually perform predetermined conversion on a sending signal, and send the obtained signals as the transmission signal a and the transmission signal b, respectively. The signal receiving means 51a receives the transmission signal a, and converts the transmission signal a to the reception signal a. The signal reception monitoring means 52a monitors the received waveform a of the transmission signal a, and the reception signal a. The signal receiving means 51b receives the transmission signal b, and converts the transmission signal b to the reception signal b. The signal reception monitoring means 52b monitors the received waveform b of the transmission signal b, and the reception signal b.

The reception controlling means 53 inputs the monitor information a and the monitor information b respectively from the signal reception monitoring means 52a and 52b. The reception controlling means 53 outputs a switching signal to the switching means 54 on the basis of the monitor information a and the monitor information b. The switching means 54 selects either the input reception signal a or b according to the switching signal, and then outputs the selected reception signal as a reception signal.

In the above operation, the reception controlling means 53 determines the transmission qualities of the signal paths a and b on the basis of the monitor information a and the monitor information b. Then, the reception controlling means 53 outputs a switching signal on the basis of the result of the determination on the transmission qualities. For example, the reception controlling means 53 compares the transmission qualities of the respective signal paths a and b on the basis of the monitor information a and the monitor information b, and then creates and outputs a switching signal for selecting the reception signal using the signal path with better transmission quality.

As described above, in the signal transmission system 3 of this exemplary embodiment, it is possible to receive a reception signal in a line with better transmission quality by selecting the reception signal from those based on the transmission signals a and b transmitted in the two lines.

In addition, the reception controlling means 53 changes transmission parameters for the line not selected by the switching signal. In the following, description will be given of adjustment of the transmission parameters in the line b when the line a is selected for the reception of the reception signal.

The reception controlling means 53 changes the signal reception parameter b set in the signal receiving means 51b. Then, the reception controlling means 53 creates a sending control signal for changing the signal sending parameter b set in the signal sending means 41b, and then sends the sending control signal to the sending controlling means 42. The sending controlling means 42 changes the signal sending parameter b set in the signal sending means 41b according to the sending control signal. In this way, the reception controlling means 53 changes the signal reception parameter b of the signal receiving means 51b and the signal sending parameter b of the signal sending means 41b. Then, on the basis of the monitor information from the signal reception monitoring means 52b, the reception controlling means 53 checks whether the signal reception quality related to the transmission signal b is improved by the above change made to the transmission parameters.

As has been described above, the signal transmission system 3 of this exemplary embodiment monitors the transmission quality in signal transmission, and selects a signal path with better transmission quality on the basis of monitor information acquired by the monitoring. Hence, with this exemplary embodiment, it is possible to receive a reception signal via a signal path with better transmission quality.

Moreover, with the signal transmission system 3 of this exemplary embodiment, it is possible to improve the transmission quality by changing the transmission parameters of the signal path which was not selected, while continuously receiving a reception signal.

Hence, with this exemplary embodiment, it is possible to ensure transmission quality in signal transmission by detecting deterioration of the transmission quality in the signal transmission and thereby adjusting the transmission parameters.

Note that, in this exemplary embodiment, although description has been given by assuming that two lines of signal paths are used for sending transmission signals, the number of lines of signal paths is not limited to two. For example, this exemplary embodiment is applicable to a signal transmission system including signal paths belonging to n respective actually-used lines (where n is an integer larger than or equal to one) and a signal path belonging to a single stand-by line.

Furthermore, in this exemplary embodiment, determination on the transmission qualities of signal paths including that in the line with improved transmission quality may be performed more than once.

Fourth Exemplary Embodiment

Figure 7:
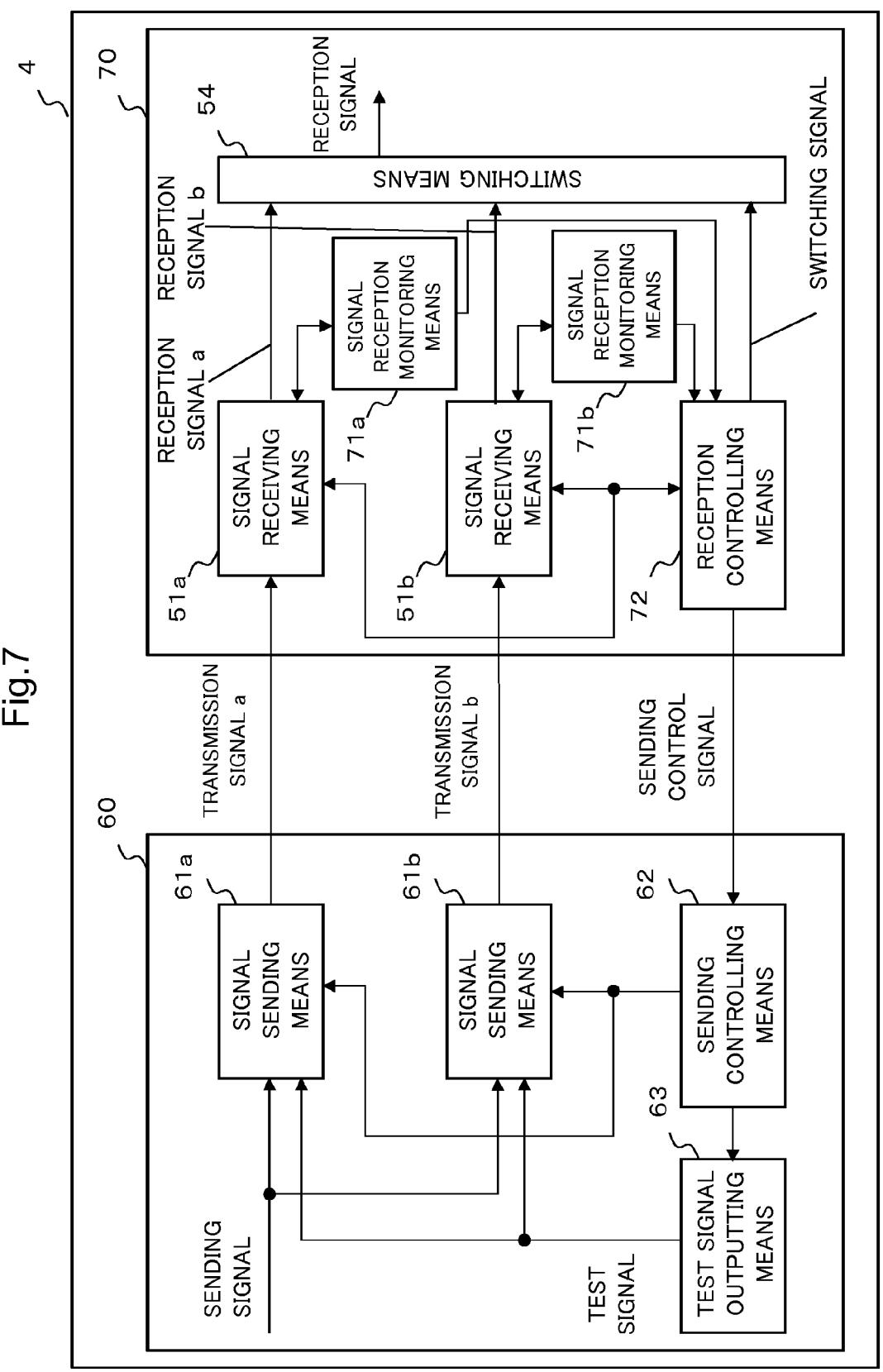
FIG. 7 is a block diagram illustrating an example of the configuration of a signal transmission system according to a fourth exemplary embodiment of the present invention.

A fourth exemplary embodiment of the present invention will be described. FIG. 7 is a block diagram of a signal transmission system 4 of this exemplary embodiment.

With reference to FIG. 7, the configuration of the signal transmission system 4 of this exemplary embodiment will be described. The signal transmission system 4 includes a signal sending device 60 and a signal receiving device 70.

The signal sending device 60 includes a signal sending means 61a, a signal sending means 61b, a sending controlling means 62, and a test signal outputting means 63. The signal receiving device 70 includes the signal receiving means 51a, the signal receiving means 51b, a signal reception monitoring means 71a, a signal reception monitoring means 71b, a reception controlling means 72, and the switching means 54.

The signal sending device 60 sends transmission signals a and b to the signal receiving device 60. The signal sending means 61a converts the sending signal to the transmission signal a by using a signal sending parameter a, and then sends the obtained transmission signal a to the signal receiving device 70. The signal sending means 61b converts the sending signal to the transmission signal b by using a signal sending parameter b, and then sends the obtained transmission signal b to the signal receiving device 70. The sending controlling means 62 controls the signal sending means 61a and 61b as well as the test signal outputting means 63 according to a sending control signal from the signal receiving device 70. The test signal outputting means 63 outputs a "test signal" on the basis of the control by the sending controlling means 62.

The "test signal" is a signal to be used for checking transmission quality in signal transmission and for setting and adjusting the transmission parameters. The test signal may include data which are not included in a normal sending signal and iteration of data, for example.

The signal receiving device 70 receives the transmission signals a and b from the signal sending device 60. The signal receiving means 51a converts the transmission signal a to a reception signal a by using a signal reception parameter a, and then outputs the obtained reception signal a. The signal receiving means 51b converts the transmission signal b to a reception signal b by using a signal reception parameter b, and then outputs the obtained reception signal b. The signal reception monitoring means 71a monitors the received waveform of the received transmission signal a, and the reception signal a obtained by converting the transmission signal a. The signal reception monitoring means 71b monitors the received waveform of the received transmission signal b, and the reception signal b obtained by converting the transmission signal b. The reception controlling means 72 controls the signal receiving means 51a and 51b as well as the switching means 54 on the basis of monitor information a and monitor information b respectively from the signal reception monitoring means 71a and 71b. Then, the reception controlling means 72 creates a sending control signal on the basis of the monitor information a and the monitor information b respectively from the signal reception monitoring means 71a and 71b, and then sends the created sending control signal to the signal sending device 60. The switching means 54 selects and outputs, as a reception signal, either the reception signal a or b according to the switching signal inputted by the reception controlling means 72.

With reference to FIG. 7, the operation of the signal transmission system 4 of this exemplary embodiment will be described.

In this exemplary embodiment, the signal sending device 60 converts the sending signal into the transmission signals a and b, and sends the transmission signals a and b in two lines, i.e., line a and line b, respectively. Then, the signal receiving device 70 receives the transmission signals a and b in the two lines via signal paths a and b, respectively, and selects, as a reception signal, an appropriate one of the reception signals a and b output as a result of predetermined conversion.

In the following, description will be given of respects which are made different by using transmission signals in two lines, and the operation related to the test signal outputting means 63 added in this exemplary embodiment.

The signal sending means 61a and the signal sending means 61b individually perform predetermined conversion on a sending signal, and send the obtained signals as the transmission signal a and the transmission signal b, respectively. The signal receiving means 51a receives the transmission signal a, and converts the transmission signal a to the reception signal a. The signal reception monitoring means 71a monitors the received waveform a of the transmission signal a, and the reception signal a. The signal receiving means 51b receives the transmission signal b, and converts the transmission signal b to the reception signal b. The signal reception monitoring means 71b monitors the received waveform b of the transmission signal b, and the reception signal b.

The reception controlling means 72 inputs the monitor information a and the monitor information b respectively from the signal reception monitoring means 71a and 71b. The reception controlling means 72 outputs a switching signal to the switching means 54 on the basis of the monitor information a and the monitor information b. The switching means 54 selects either the input reception signal a or b according to the switching signal, and then outputs the selected reception signal as a reception signal.

In the above operation, the reception controlling means 72 determines the transmission qualities on the basis of the monitor information a and the monitor information b. Then, the reception controlling means 72 outputs a switching signal on the basis of the result of determination on the transmission qualities. For example, the reception controlling means 72 compares the transmission qualities on the basis of the monitor information a and the monitor information b, and then creates and outputs a switching signal for selecting the reception signal using the signal path with better transmission quality.

As described above, in the signal transmission system 4 of this exemplary embodiment, it is possible to receive a reception signal in a line with better transmission quality by selecting the reception signal from those based on the transmission signals a and b transmitted in the two lines.

In addition, the reception controlling means 72 changes transmission parameters of the line not selected by the switching signal. In the following, description will be given of adjustment of the transmission parameters in the line b when the line a is selected for the reception of the reception signal.

The reception controlling means 72 changes the signal reception parameter b set in the signal receiving means 51b. Then, the reception controlling means 72 creates a sending control signal for changing the signal sending parameter b set in the signal sending means 61b, and then sends the sending control signal to the sending controlling means 62. The sending controlling means 62 changes the signal sending parameter b set in the signal sending means 61b, according to the sending control signal.

In this way, the reception controlling means 72 changes the signal reception parameter b of the signal receiving means 51b and the signal sending parameter b of the signal sending means 61b. Then, on the basis of the monitor information from the signal reception monitoring means 71b, the reception controlling means 72 checks whether the transmission quality related to the transmission signal b is improved by the above change made to the transmission parameters.

To check the signal reception quality after the above change of the transmission parameters in the line b, the reception controlling means 72 may perform check using a test signal. The reception controlling means 72 creates a sending control signal for causing the sending controlling means 62 to start the test signal outputting means 63, and then outputs the created sending control signal to the sending controlling means 62.

The sending controlling means 62 starts the test signal outputting means 63 according to the sending control signal. The test signal outputting means 63 outputs a test signal. The signal sending means 61b converts the test signal to the transmission signal b by using the signal sending parameter b set therein, and then outputs the obtained transmission signal b.

The signal receiving means 51b receives the transmission signal b. The signal reception monitoring means 71b observes the received waveform of the transmission signal b, and monitors the reception signal b obtained by converting the transmission signal b. Then, the reception controlling means 72 checks the transmission quality on the basis of the monitor information b from the signal reception monitoring means 71b. The reception controlling means 72 sets and adjusts the transmission parameters on the basis of the result of the check of the transmission quality.

As described above, the reception controlling means 72 can check the transmission quality in signal transmission, and thereby set and adjust the transmission parameters, on the basis of the monitor information b obtained by receiving the transmission signal b transmitted by converting the test signal. The test signal may include data which are not included in a normal sending signal and iteration of data, for example. Hence, the reception controlling means 72 can efficiently set and change the transmission parameters on the basis of the result of check of transmission quality.

Thus, the signal transmission system 4 of this exemplary embodiment can receive a reception signal from a signal path with better transmission quality as in the third exemplary embodiment.

Moreover, the signal transmission system 4 of this exemplary embodiment can check the transmission quality of the signal path which is not selected and change the corresponding transmission parameters, while continuously receiving a reception signal. In the operation, it is possible to efficiently set and change the transmission parameters by checking the transmission quality by using a test signal, in this exemplary embodiment.

Note that, in this exemplary embodiment, although description has been given by assuming that two lines of signal paths are used for sending transmission signals, the number of lines of signal paths is not limited to two. For example, this exemplary embodiment is applicable to a signal transmission system including signal paths belonging to n respective actually-used lines (where n is an integer larger than or equal to one) and a signal path belonging to a single stand-by line.

Moreover, in this exemplary embodiment, determination on the transmission qualities of signal paths including that in the line with improved transmission quality may be performed more than once.

Furthermore, in this exemplary embodiment, description has been given that check of transmission quality of an unused signal path and adjustment of transmission parameters are performed by using a test signal. However, a signal path through which a test signal is transmitted is not limited to an unused signal path. For example, the signal transmission system of this exemplary embodiment may perform check of transmission quality as well as setting and adjustment of transmission parameters by outputting a test signal to a signal path before the transmission signal is sent or on a regular basis.

Note that the invention of this application is not limited to the above-described exemplary embodiments, and various changes and modifications can be made without departing from the gist of the invention of this application.

For example, the signal reception history storing means described in the second exemplary embodiment may be applied to the third exemplary embodiment and the fourth exemplary embodiment.

Moreover, in the above-described exemplary embodiments, the signal sending device for sending a transmission signal and the signal receiving device for receiving a transmission signal are described separately. However, the present invention may be applied to a communication device which includes both the signal sending function and the signal receiving function, and sends and receives transmission signals therebetween, and a communication device for bidirectionally transmitting a transmission signal.

Further, a communication device including the signal sending device, the signal receiving device, the signal sending function, and the signal receiving function of the present invention may be a semiconductor device, a built-in module, or the like with the function of sending or receiving a transmission signal, for example.

In addition, the signal reception control processes related to signal reception monitoring, signal reception control, and signal sending control in the above-described exemplary embodiments may be executed by software by using a computer included in the signal sending device, signal receiving device, and a signal communication device. In other words, control of the process related to signal reception control may be performed by loading a computer program for performing a process related to signal reception control into a central processing unit (CPU) (not illustrated), and then executing the computer program. It is possible to perform the same operations of the process as those related to signal reception control in the above-described exemplary embodiments, even when the process related to signal reception control is performed by using the program.

The program may be stored in a nonvolatile medium such as a semiconductor storage, an optical disk, a magnetic disk, or a magneto-optical disk, e.g., a read only memory (ROM), a random access memory (RAM), or a flash memory.

The invention claimed is:
1. A signal transmission system comprising:
   a signal sending device including
      a first signal sender which converts a sending signal to
         a first transmission signal by using a first signal sending parameter and sends the first transmission signal to a first signal path, a second signal sender which converts the sending signal to a second transmission signal by using a second signal sending parameter and sends the second transmission signal to a second signal path, and a sending controller which receives a first sending control signal and changes the first signal sending parameter or the second signal sending parameter according to the first sending control signal; and a signal receiving device including a first signal receiver which converts the first transmission signal received via the first signal path, to a first reception signal by using a first signal reception parameter, a first signal reception monitor which monitors a signal reception status of the first transmission signal and outputs first monitor information acquired by the monitoring, a second signal receiver which converts the second transmission signal received via the second signal path, to a second reception signal by using a second signal reception parameter, a second signal reception monitor which monitors a signal reception status of the second transmission signal and outputs second monitor information acquired by the monitoring, a reception controller which checks transmission quality of the first signal path and the second signal path by using the first monitor information and the second monitor information, creates and outputs a switching signal for selecting the first reception signal or the second reception signal, creates and sends the first sending control signal for changing the first signal sending parameter or the second signal sending parameter according to a result of the check, and changes the first signal reception parameter or the second signal reception parameter corresponding to the signal path which is not selected by the switching signal.

2. The signal transmission system according to claim 1, wherein the first signal reception monitor observes signal reception waveform of the first transmission signal, and the first monitor information includes measurement information acquired by the observation.

3. The signal transmission system according to claim 2, wherein the first signal reception monitor detects a signal reception error in the first reception signal, and the first monitor information further includes detection information acquired by the by the first signal reception monitor.

4. The signal transmission system according to claim 1, wherein the signal receiving device further includes a signal reception history storing unit which stores, as signal reception history information, time information indicating time at which the first signal reception monitor acquired the first monitor information, and the first monitor information, and the reception controller checks the transmission quality of the first signal path according to the signal reception history information, and changes the first signal sending parameter and the first signal reception parameter according to the result of the check.

5. The signal transmission system according to claim 1, wherein the signal sending device further includes a test signal outputting unit which outputs a predetermined test signal for checking the transmission quality of the first signal path, and setting and changing the first signal sending parameter and the first signal reception parameter, the reception controller creates a second sending control signal for converting the test signal to the first transmission signal and sending the first transmission signal, and sends the second sending control signal to the signal sending device, the sending controller receives the second sending control signal, and causes the test signal outputting unit to output the test signal to the first signal sender according to the second sending control signal, and the first signal sender converts the test signal to the first transmission signal by using the first signal sending parameter and sends the first transmission signal to the first signal path.

6. The signal transmission system according to claim 1, wherein the signal receiving device further includes a switching unit which selects either the first reception signal or the second reception signal according to the switching signal from the reception controller, and outputs the selected reception signal as a third reception signal, the reception controller creates and sends a third sending control signal for changing the first signal sending parameter or the second signal sending parameter corresponding to the first signal path or the second signal path which is not selected by the switching signal, and changes the first signal reception parameter or the second signal reception parameter corresponding to the signal path which is not selected by the switching signal, the switching unit selects either the first reception signal or the second reception signal according to the switching signal, and outputs the selected reception signal as a third reception signal, and the sending controller receives the third sending control signal, and changes the first signal sending parameter or the second signal sending parameter according to the third sending control signal.

7. A signal receiving device comprising: a signal receiver which receives a transmission signal obtained by converting a sending signal by using a predetermined signal sending parameter and sent to a first signal path and a second signal path, and converts the transmission signal to a reception signal by using a predetermined signal reception parameter; a signal reception monitor which monitors a signal reception status of the transmission signal and outputs monitor information acquired by the monitoring; and a reception controller which checks transmission quality of the first signal path and the second signal path by using the monitor information, creates and sends a sending control signal for selecting the first signal path or the second signal path according to a result of the check, and changes the predetermined signal reception parameter of the first signal path or the second signal path which is not selected by the result of the check.

8. A signal sending device comprising: a first signal sender which converts a sending signal to a first transmission signal by using a first signal sending parameter and sends the first transmission signal to a first signal path; a second signal sender which converts the sending signal to a second transmission signal by using a second signal sending parameter and sends the second transmission signal to a second signal path; and a sending controller which monitors a signal reception status of the first transmission signal and the second transmission signal, checks transmission quality of the first signal path and the second signal path according to first monitor information and second monitor information acquired by a monitoring of the signal reception status of the first transmission signal and the second transmission signal, receives a sending control signal for changing the first signal sending parameter or the second signal sending parameter, the sending control signal being created according to a result of the check, and changes the first signal sending parameter or the second sending parameter according to the sending control signal.

9. A non-transitory computer readable medium storing signal receiving device control program for causing a computer included in a signal receiving device, the signal receiving device including a signal receiver which receives a transmission signal obtained by converting a sending signal by using a predetermined signal sending parameter and send to a first signal path and a second signal path, and converts the transmission signal to a reception signal by using a predetermined signal reception parameter, and a signal reception monitor which monitors a signal reception status of the transmission signal and outputs monitor information acquired by the monitoring,
to perform
checking transmission quality of the first signal path and the second signal path by using the monitor information,
creating and sending a second control signal for selecting the first signal path or the second signal path according to a result of the check, and
changing the predetermined signal reception parameter of the first signal path or the second signal path which is not selected by the result of the check.

10. A signal transmission method comprising:
converting a sending signal to a first transmission signal by using a first signal sending parameter, and sending the first transmission signal to a first signal path;
converting the sending signal to a second transmission signal by using a second signal sending parameter, and sending the second transmission signal to a second signal path;
receiving the first transmission signal via the first signal path, converting the first transmission signal to a first reception signal by using a first signal reception parameter, and outputting the first reception signal;
receiving the second transmission signal via the second signal path, converting the second transmission signal to a second reception signal by using a second signal reception parameter, and outputting the second reception signal;
monitoring a signal reception status of the first transmission signal, and outputting first monitor information acquired by monitoring the signal reception status of the first transmission signal;
monitoring a signal reception status of the second transmission signal, and outputting second monitor information acquired by monitoring the signal reception status of the second transmission signal;
checking transmission quality of the first signal path and the second signal path according to the first monitor information and the second monitor information, creating and sending a sending control signal for selecting the first signal path or the second signal path, according to a result of the check, and changing the first reception signal parameter or the second signal reception parameter; and
receiving the sending control signal, and changing the first signal sending parameter or the second signal sending parameter according to the sending control signal.

11. A signal transmission system comprising:
a signal sending device including a first signal sender implemented at least by first hardware, including a processor and memory, which converts a sending signal to a first transmission signal by using a first signal sending parameter and sends the first transmission signal to a first signal path, a second sender implemented at least by the first hardware which converts the sending signal to a second transmission signal by using a second signal sending parameter and sends the second transmission signal to a second signal path, and a sending controller implemented at least by the first hardware which receives a sending control signal and changes the first signal sending parameter or the second signal sending parameter according to the sending control signal; and
a signal receiving device including a first signal receiver implemented at least by second hardware, including a processor and memory, which converts the first transmission signal received via the first signal path, to a first reception signal by using a first signal reception parameter, a first signal reception monitor implemented at least by the second hardware which monitors a signal reception status of the first transmission signal and outputs first monitor information acquired by monitoring the signal reception status of the first transmission signal, a second signal receiver implemented at least by the second hardware which converts the second transmission signal received via the second signal path, to a second reception signal by using a second signal reception parameter, a second signal reception monitor implemented at least by the second hardware which monitors a signal reception status of the second transmission signal and outputs second monitor information acquired by monitoring reception status of the second transmission signal, and a reception controller which checks transmission quality of the first signal path and the second signal path by using the first monitor information and the second monitor information, creates and outputs a switching signal for selecting the first reception signal or the second reception signal, creates and sends the sending control signal for changing the first signal sending parameter according to a result of the check to send the sending control signal, and changes the first signal reception parameter or the second signal reception parameter corresponding to the signal path which is not selected by the switching signal.

* * * * *